(12) United States Patent
Motoyoshi et al.

(10) Patent No.: US 8,877,304 B2
(45) Date of Patent: Nov. 4, 2014

(54) OPTICAL FILM

(75) Inventors: Tetsuya Motoyoshi, Chiyoda-ku (JP); Masatoshi Ando, Chiyoda-ku (JP); Makoto Ueno, Chiyoda-ku (JP); Akiko Nishijima, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 882 days.

(21) Appl. No.: 12/452,180

(22) PCT Filed: Jun. 17, 2008

(86) PCT No.: PCT/JP2008/061379
§ 371 (c)(1),
(2), (4) Date: Dec. 18, 2009

(87) PCT Pub. No.: WO2008/156186
PCT Pub. Date: Dec. 24, 2008

(65) Prior Publication Data
US 2010/0104777 A1    Apr. 29, 2010

(30) Foreign Application Priority Data

Jun. 19, 2007  (JP) .................................. 2007-161134
Aug. 2, 2007   (JP) .................................. 2007-202113

(51) Int. Cl.
| C09K 19/00 | (2006.01) |
| C08G 64/16 | (2006.01) |
| C08J 5/18 | (2006.01) |
| G02F 1/13363 | (2006.01) |

(52) U.S. Cl.
CPC ..... *C08G 64/1608* (2013.01); *G02F 2001/133637* (2013.01); *C08J 2369/00* (2013.01); *G02F 1/13363* (2013.01); *C08J 5/18* (2013.01)
USPC ............. 428/1.31; 428/1.1; 428/412; 349/75; 349/96; 349/98; 349/117; 528/196; 528/204; 528/206

(58) Field of Classification Search
USPC ........... 428/1.1, 1.31, 412, 64.7; 349/75, 117, 349/96, 98; 528/206, 196, 204
See application file for complete search history.

(56) References Cited

U.S. PATENT DOCUMENTS

| 5,858,499 A | 1/1999 | Abe et al. |
| 6,565,974 B1 | 5/2003 | Uchiyama et al. |
| 6,638,582 B1 | 10/2003 | Uchiyama et al. |

FOREIGN PATENT DOCUMENTS

| JP | 63-035619 | 2/1988 |
| JP | 02-120804 | 5/1990 |
| JP | 08-311191 | 11/1996 |
| JP | 10-101787 | 4/1998 |
| JP | 3160209 | 2/2001 |
| JP | 2002-048919 | 2/2002 |
| JP | 3325560 | 7/2002 |
| JP | 2003-294942 | 10/2003 |
| JP | 2003-329840 | 11/2003 |
| JP | 2004-067990 | 3/2004 |
| JP | 2006-323254 | 11/2006 |
| JP | 3995387 | 8/2007 |
| WO | 01/09649 | 2/2001 |
| WO | 2006/041190 | 4/2006 |

OTHER PUBLICATIONS

Machine English translation of WO 2006/041190, Aug. 2012.*
International Search Report issued Sep. 22, 2008 in corresponding International (PCT) Application No. PCT/JP2008/061379.

(Continued)

*Primary Examiner* — Gwendolyn Blackwell
*Assistant Examiner* — Ruiyun Zhang
(74) *Attorney, Agent, or Firm* — Wenderoth, Lind & Ponack, L.L.P.

(57) ABSTRACT

It is an object of the present invention to provide an optical film which has reverse chromatic dispersibility that its retardation becomes smaller as the wavelength becomes shorter and a low photoelastic constant.

The optical film is made of a polycarbonate copolymer containing a unit (A) represented by the following formula:

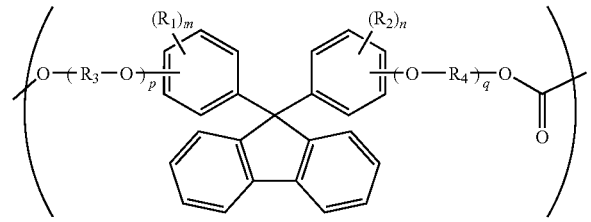

wherein $R_1$ and $R_2$ are each independently a hydrogen atom, hydrocarbon group having 1 to 10 carbon atoms or the like, $R_3$ and $R_4$ are each independently a hydrocarbon group having 1 to 10 carbon atoms or the like, "m" and "n" are each independently an integer of 0 to 4, and "p" and "q" are each independently an integer of 0 or more,
and a unit (B) represented by the following formula:

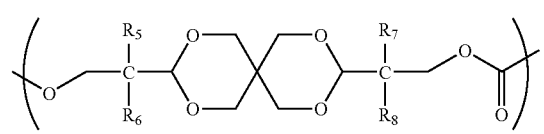

wherein $R_5$ to $R_8$ are each independently a hydrogen atom or alkyl group having 1 to 10 carbon atoms,
the (A/B) molar ratio of the unit (A) to the unit (B) is 10/90 to 90/10 and which satisfies the following expression (1):

$$R(450) < R(550) < R(650) \tag{1}$$

wherein $R(450)$, $R(550)$ and $R(650)$ are retardation values within the plane of the film at wavelengths of 450 nm, 550 nm and 650 nm, respectively.

6 Claims, No Drawings

(56) References Cited

OTHER PUBLICATIONS

International Preliminary Report on Patentability issued Jan. 21, 2010 in corresponding International (PCT) Application No. PCT/JP2008/061379, including English translation of PCT written opinion.

Supplementary European Search Report issued Jun. 10, 2010 in corresponding European Application No. 08765790.

* cited by examiner

OPTICAL FILM

TECHNICAL FIELD

The present invention relates to an optical film. The present invention relates to an optical film which has desired chromatic dispersibility, a low photoelastic constant and high heat resistance.

BACKGROUND OF THE ART

An optical film is used as a retardation film or a protective film for polarizing plates. The retardation film is used in liquid crystal displays and the like and has such functions as color correction, the expansion of the view angle and antireflection. A λ/4 plate and a λ/2 plate are known as the retardation film, and a polycarbonate, polyether sulfone and polysulfone are used as the materials of these plates. The λ/4 plate and the λ/2 plate made from these materials are characterized in that their retardation becomes larger as the wavelength becomes shorter. Therefore, the wavelength at which the λ/4 plate and the λ/2 plate can function is limited to a specific wavelength.

As means of controlling the wavelength at a broad band, there is known a method in which two or more birefringence films having different wavelength dependences of retardation are laminated together at a specific angle (JP-A 2-120804: Patent Document 1). This method needs the step of laminating together a plurality of retardation films and the step of adjusting the lamination angle, thereby causing a problem with productivity. Further, as the thickness of the whole retardation film becomes large, its light transmittance lowers with the result that it becomes dark therewith.

There has recently been proposed a method of controlling the wavelength at a broad band with a single film without laminating together a plurality of films as described above (Japanese Patent No. 3325560; Patent Document 2). In this method, a polycarbonate copolymer comprising a unit having positive refractive index anisotropy and a unit having negative refractive index anisotropy is used. However, this polycarbonate copolymer has a high melting temperature because it contains a unit derived from a fluorene-based bisphenol and readily produces a gel through its decomposition when it is molten. Further, it has a high glass transition temperature (Tg), a high temperature is required to stretch a film thereof, and special processing equipment different from that of the prior art is needed. It has a high photoelastic constant and large stress birefringence and involves such a problem as light slipping when it is used as a retardation film.

Meanwhile, a polycarbonate copolymer which is used in an optical fiber or an optical disk, comprises an aliphatic diol and has a low photoelastic constant has already been proposed (Japanese Patent No. 3160209: Patent Document 3). However, the stretching and chromatic dispersibility of a film are not investigated in this document. The photoelastic constant of the polycarbonate copolymer described in this document must be further reduced when it is used as a retardation film or a protective film for polarizing plates.

There has also been reported a retardation film which is made of a polycarbonate copolymer containing a fluorene ring and an isosorbide component and has a low photoelastic constant (WO06/041190: Patent Document 4). Since this polycarbonate copolymer is a terpolymer, it is necessary to control the ratio of three components precisely in order to control its chromatic dispersibility and therefore, it is not easy to produce the polycarbonate copolymer stably. Since it has low heat stability, its molecular weight is apt to lower at the time of melting.

There has further been proposed a retardation film made of a polycarbonate copolymer containing a fluorene-based bisphenol skeleton (WO01/009649: Patent Document 5, JP-A 2006-323254: Patent Document 6).

There has further been proposed a polarizing plate protective film made of a polycarbonate copolymer containing a fluorene-based bisphenol skeleton (Japanese Patent No. 3995387: Patent Document 7).
(Patent Document 1) JP-A 2-120804
(Patent Document 2) Japanese Patent No. 3325560
(Patent Document 3) Japanese Patent No. 3160209
(Patent Document 4) WO06/041190
(Patent Document 5) WO01/009649
(Patent Document 6) JP-A 2006-323254
(Patent Document 7) Japanese Patent No. 3995387

DISCLOSURE OF THE INVENTION

It is an object of the present invention to provide an optical film which has reverse chromatic dispersibility that its retardation becomes smaller as the wavelength becomes shorter and a low photoelastic constant.

The inventors of the present invention have found that a polycarbonate copolymer obtained from a diol having a fluorene structure in the side chain and an aliphatic diol has excellent melt processability and can be easily stretched. They have also found that a stretched film obtained from the polycarbonate copolymer has reverse chromatic dispersibility that its retardation becomes smaller as the wavelength becomes shorter and a low photoelastic constant. The present invention has been accomplished based on these findings.

That is, the present invention is an optical film which is made of a polycarbonate copolymer containing a unit (A) represented by the following formula:

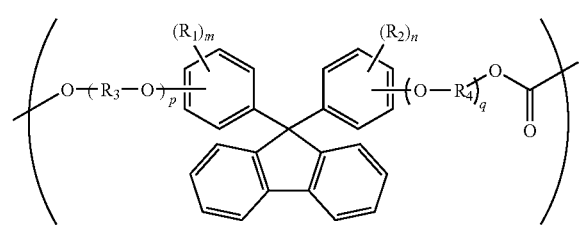

wherein $R_1$ and $R_2$ are each independently a hydrogen atom, hydrocarbon group having 1 to 10 carbon atoms which may contain an aromatic group, or halogen atom, $R_3$ and $R_4$ are each independently a hydrocarbon group having 1 to 10 carbon atoms which may contain an aromatic group, "m" and "n" are each independently an integer of 0 to 4, and "p" and "q" are each independently an integer of 0 or more, and a unit (B) represented by the following formula:

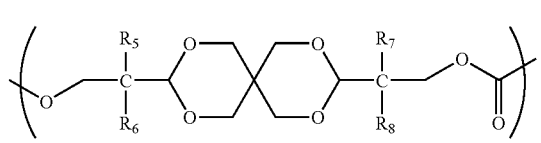

wherein $R_5$ to $R_8$ are each independently a hydrogen atom or alkyl group having 1 to 10 carbon atoms, the (A/B) molar ratio of the unit (A) to the unit (B) is 10/90 to 90/10 and which satisfies the following expression (1):

$$R(450) < R(550) < R(650) \quad (1)$$

wherein R(450), R(550) and R(650) are retardation values within the plane of the film at wavelengths of 450 nm, 550 nm and 650 nm, respectively.

The present invention includes the above optical film which satisfies the following expressions (2) and (3).

$$0 < R(450)/R(550) < 1 \quad (2)$$

$$1.01 < R(650)/R(550) < 2 \quad (3)$$

The present invention also includes the above optical film which satisfies the following expressions (4) to (6).

$$R(450) < 0 \quad (4)$$

$$-10 < R(550) < 10 \quad (5)$$

$$0 < R(650) \quad (6)$$

The present invention further includes the above optical film which satisfies the following expression (7).

$$R(450) < R(550) < R(650) < 0 \quad (7)$$

BEST MODE FOR CARRYING OUT THE INVENTION

Polycarbonate Copolymer

The optical film of the present invention is made of a polycarbonate copolymer containing a unit (A) and a unit (B).
(Unit (A))
The unit (A) is represented by the following formula.

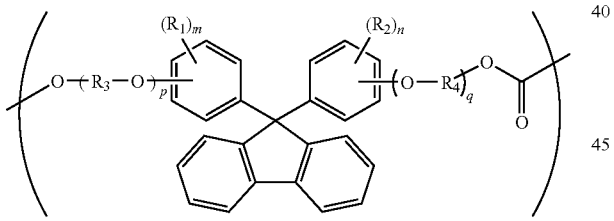

In the unit (A), $R_1$ and $R_2$ are each independently a hydrogen atom, hydrocarbon group having 1 to 10 carbon atoms which may contain an aromatic group, or halogen atom. Examples of the hydrocarbon group include alkyl groups having 1 to 10 carbon atoms, cycloalkyl groups having 5 to 10 carbon atoms, aryl groups having 6 to 10 carbon atoms, aralkyl groups having 7 to 10 carbon atoms and alkenyl groups having 1 to 10 carbon atoms. Examples of the halogen atom include fluorine atom, chlorine atom and bromine atom.

$R_3$ and $R_4$ are each independently a hydrocarbon group having 1 to 10 carbon atoms which may contain an aromatic group. The hydrocarbon group is preferably an alkylene group having 1 to 10 carbon atoms, more preferably an alkylene group having 1 to 4 carbon atoms, much more preferably an ethylene group.

"p" and "q" indicate the numbers of the recurring units —($R_3$—O)— and (O—$R_4$)—, respectively. "p" and "q" are each independently an integer of 0 or more, preferably 0 to 20, more preferably 0 to 12, much more preferably 0 to 8, particularly preferably 0 to 4, most preferably 0 or 1.

"m" and "n" is each independently an integer of 0 to 4.
(When "p" and "q" are Both "0")

When "p" and "q" are both "0", the unit (A) is represented by the following formula (may be referred to as "unit (A1)" hereinafter).

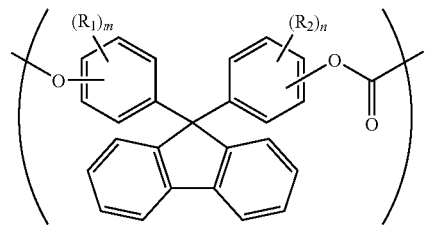

$R_1$ and $R_2$ are the same as in the unit (A).

Examples of the unit (A1) include units derived from 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-propylphenyl)fluorene, 9,9-bis(4-hydroxy-3-cyclohexylphenyl)fluorene and 9,9-bis(4-hydroxy-3-phenylphenyl)fluorene. The compounds inducing these units (A1) may be used alone or in combination of two or more.

A unit (A2) represented by the following formula derived from 9,9-bis(4-hydroxy-3-methylphenyl)fluorene is particularly preferred.

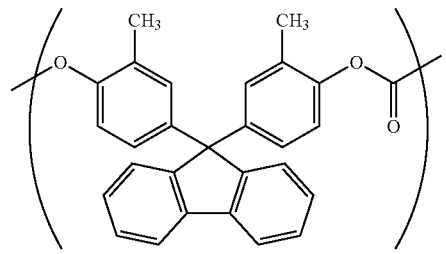

The b value measured at an optical path length of 30 mm of a solution obtained by dissolving 10 g of the polycarbonate copolymer containing the unit (A2) in 50 ml of ethanol is preferably not more than 6.0, more preferably not more than 5.5, much more preferably not more than 5.0. When the b value falls within the above range, an optical film formed from the polycarbonate copolymer has a good color and high strength.

9,9-bis(4-hydroxy-3-methylphenyl)fluorene which is the raw material of the unit (A2) is obtained through a reaction between o-cresol and fluorenone. 9,9-bis(4-hydroxy-3-methylphenyl)fluorene having a small b value can be obtained by removing impurities.

Stated more specifically, after the reaction between o-cresol and fluorenone, unreacted o-cresol is distilled off, the residue is dissolved in an alcohol-based, ketone-based or benzene derivative-based solvent, and activated earth or activated carbon is added to the obtained solution, the resulting solution is filtered, and a product crystallized from the filtrate is filtered to obtain purified 9,9-bis(4-hydroxy-3-methylphenyl)fluorene. The impurities to be removed include 2,4'-dihydroxy form, 2,2'-dihydroxy form and impurities having an unknown structure. The alcohol-based solvent used for purification is preferably a lower alcohol such as methanol, ethanol, propanol or butanol. The ketone-based solvent is preferably a lower aliphatic ketone such as acetone, methyl ethyl ketone, methyl isopropyl ketone, cyclohexanone, or a mixture thereof. The benzene derivative-based solvent is preferably toluene, xylene, benzene or a mixture thereof. The solvent is used in an amount that dissolves the fluorene compound completely, and the amount is generally 2 to 10 times the amount of the fluorene compound. Commercially available activated earth comprising powdery or granular silica-alumina as the main component is used. Further, commercially available powdery or granular activated carbon is used.

(When "p" and "q" are Each an Integer of 1 or More)

When "p" and "q" are each an integer of 1 or more, the unit (A) is represented by the following formula (may be referred to as "unit (A3)" hereinafter).

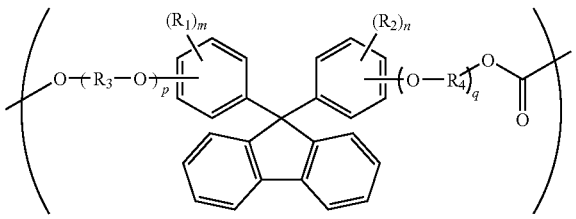

Examples of the unit (A3) include 9,9-bis[4-(2-hydroxyethoxy)phenyl]fluorene, 9,9-bis[4-(3-hydroxypropoxy)phenyl]fluorene, 9,9-bis[4-(4-hydroxybutoxy)phenyl]fluorene, 9,9-bis[4-(2-hydroxyethoxy)-3-methylphenyl]fluorene, 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(2-hydroxyethoxy)-3-isopropylphenyl]fluorene, 9,9-bis[4-(2-hydroxyethoxy)-3-n-butylphenyl]fluorene, 9,9-bis[4-(2-hydroxyethoxy)-3-isobutylphenyl]fluorene, 9,9-bis[4-(2-hydroxyethoxy)-3-(1-methylpropyl)phenyl]fluorene, 9,9-bis[4-(3-hydroxypropoxy)-3-methylphenyl]fluorene, 9,9-bis[4-(4-hydroxybutoxy)-3-methylphenyl]fluorene, 9,9-bis[4-(2-hydroxyethoxy)-3,5-dimethylphenyl]fluorene, 9,9-bis[4-(2-hydroxyethoxy)-2,5-dimethylphenyl]fluorene, 9,9-bis[4-(2-hydroxyethoxy)-3,5-diethylphenyl]fluorene, 9,9-bis[4-(2-hydroxyethoxy)-3,5-dipropylphenyl]fluorene, 9,9-bis[4-(2-hydroxyethoxy)-3,5-diisopropylphenyl]fluorene, 9,9-bis[4-(2-hydroxyethoxy)-3,5-di-n-butylphenyl]fluorene, 9,9-bis[4-(2-hydroxyethoxy)-3,5-diisobutylphenyl]fluorene, 9,9-bis[4-(2-hydroxyethoxy)-3,5-bis(1-methylpropyl)phenyl]fluorene, 9,9-bis[4-(3-hydroxypropoxy)-3,5-dimethylphenyl]fluorene, 9,9-bis[4-(4-hydroxybutoxy)-3,5-dimethylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 9,9-bis[4-(2-hydroxyethoxy)-3,5-diphenylphenyl]fluorene, 9,9-bis[4-(2-hydroxyethoxy)-3,5-benzylphenyl]fluorene, 9,9-bis[4-(2-hydroxyethoxy)-3,5-dibenzylphenyl]fluorene, 9,9-bis[4-(2-hydroxyethoxy)-3-propenylphenyl]fluorene, 9,9-bis[4-(2-hydroxyethoxy)-3-fluorophenyl]fluorene, and units derived from these 9,9-bis(hydroxyalkoxyphenyl)fluorenes. Units derived from 9,9-bis[hydroxypoly(alkyleneoxy)phenyl]fluorenes in which "p" and "q" are 2 or more are also included.

Out of these, 9,9-bis[4-(2-hydroxyethoxy)phenyl]fluorene and 9,9-bis[4-(2-hydroxyethoxy)-3-methylphenyl]fluorene are preferred.

A unit (A4) derived from 9,9-bis[4-(2-hydroxyethoxy)phenyl]fluorene (BPEF) represented by the following formula is particularly preferred.

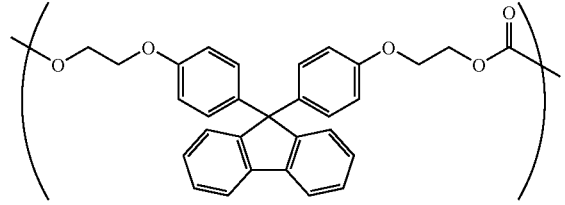

The compounds inducing the unit (A3) may be used alone or in combination of two or more.

The compounds inducing the unit (A3) are obtained through a reaction between a 9,9-bis(hydroxyphenyl)fluorene and a compound corresponding to the groups $R_3$ and $R_4$ (such as alkylene oxide or haloalkanol). For example, 9,9-bis[4-(2-hydroxyethoxy)phenyl]fluorene is obtained by adding ethylene oxide to 9,9-bis(4-hydroxyphenyl)fluorene. 9,9-bis[4-(3-hydroxypropoxy)phenyl]fluorene is obtained, for example, by reacting 9,9-bis[4-hydroxyphenyl]fluorene with 3-chloropropanol in an alkaline condition. 9,9-bis(hydroxyphenyl)fluorene can be obtained through a reaction with a phenol corresponding to fluorenone (such as 9-fluorenone). 9,9-bis(4-hydroxyphenyl) fluorene can be obtained, for example, through a reaction between a phenol and 9-fluorenone.

(Unit (B))

The unit (B) is represented by the following formula.

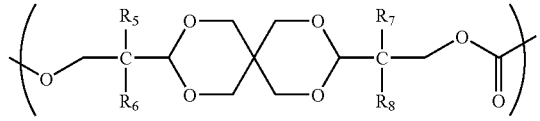

In the above formula, $R_5$ to $R_8$ are each independently a hydrogen atom or alkyl group having 1 to 10 carbon atoms. The alkyl group is preferably an alkyl group having 1 to 3 carbon atoms. A methyl group is particularly preferred. The unit B is derived from a dihydroxy compound having a spiro ring which has a low photoelastic constant and high heat resistance.

Specific examples of the unit (B) are units derived from 3,9-bis(1,1-dimethyl-2-hydroxyethyl)-2,4,8,10-tetraoxaspiro[5,5]undecane, 3,9-bis(1,1-diethyl-2-hydroxyethyl)-2,4,8,10-tetraoxaspiro[5,5]undecane) and 3,9-bis(1,1-dipropyl-2-hydroxyethyl)-2,4,8,10-tetraoxaspiro[5,5]undecane.

(Unit (B1))

A unit (B1) represented by the following formula derived from 3,9-bis(1,1-dimethyl-2-hydroxyethyl)-2,4,8,10-tetraoxaspiro[5,5]undecane (to be referred to as "spiroglycol" hereinafter) is particularly preferred.

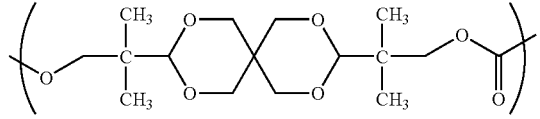

(Composition Ratio)

The (A/B) molar ratio of the unit (A) to the unit (B) in the polycarbonate copolymer is 10/90 to 90/10. When the molar ratio is lower than 10/90, the glass transition temperature of the polycarbonate copolymer becomes lower than 110° C. and its heat resistance degrades. When the (A/B) molar ratio is higher than 90/10, the glass transition temperature of the polycarbonate copolymer becomes high, causing a problem with processability. Further, the photoelastic constant exceeds $30 \times 10^{-12}$ $Pa^{-1}$. The (A/B) molar ratio is measured and calculated by the proton NMR of the JNM-AL400 of JEOL Ltd.

(Glass Transition Temperature: Tg)

The glass transition temperature (Tg) of the polycarbonate copolymer is preferably 110 to 170° C., more preferably 110 to 160° C. When the glass transition temperature (Tg) is lower than 110° C., the heat-resistant stability of the polycarbonate copolymer degrades and its retardation value changes along with the passage of time, which may affect display quality. When the glass transition temperature (Tg) is higher than 170° C. and the polycarbonate copolymer is molten to be formed into a film, its viscosity becomes too high, thereby making it difficult to form it into a film. The glass transition temperature (Tg) is measured at a temperature elevation rate of 20° C./min by using the 2910 DSC of TA Instruments. Japan.

(Photoelastic Constant)

The absolute value of the photoelastic constant of the polycarbonate copolymer is preferably not more than $30 \times 10^{-12}$ $Pa^{-1}$, more preferably not more than $25 \times 10^{-12}$ $Pa^{-1}$, much more preferably not more than $20 \times 10^{-12}$ $Pa^{-1}$. When the absolute value is larger than $30 \times 10^{-12}$ $Pa^{-1}$, stress birefringence becomes large, whereby light slipping occurs disadvantageously when it is used as a retardation film. The photoelastic constant is measured by cutting out a sample having a length of 50 mm and a width of 10 mm from the film and using the Spectroellipsometer M-220 of JASCO CORPORATION.

(5% Weight Loss Temperature: Td)

The 5% weight loss temperature (Td) by heat of the polycarbonate copolymer is preferably 380° C. or higher, more preferably 400° C. or higher. When the 5% weight loss temperature (Td) is lower than 380° C., decomposition readily occurs at the time of melt forming a film and foreign matter is produced and may affect display quality. The 5% weight loss temperature (Td) is obtained by thermogravimetric measurement in a nitrogen stream having a rate of 40 ml/min at a temperature elevation rate of 20° C./min, using the TGA 951 Thermogravimetric analyzer of E.I. Du Pont De Nemours & Co. as a temperature at which the weight of the polycarbonate copolymer is reduced by 5%.

(Production Method)

The polycarbonate copolymer can be produced by melt polymerizing a fluorene dihydroxy component, an aliphatic diol component and a diester carbonate.

The diester carbonate is an ester such as aryl group having 6 to 12 carbon atoms or aralkyl group which may be substituted. Specific examples of the diester carbonate include diphenyl carbonate, ditolyl carbonate, bis(chlorophenyl)carbonate and m-cresyl carbonate. Out of these, diphenyl carbonate is particularly preferred.

The amount of diphenyl carbonate is preferably 0.97 to 1.10 moles, more preferably 1.00 to 1.06 moles based on 1 mole of the dihydroxy compound.

To accelerate the polymerization rate in the melt polymerization method, a polymerization catalyst may be used. The polymerization catalyst is selected from an alkali metal compound, alkali earth metal compound, nitrogen-containing compound and metal compound.

Specific examples of these compounds include organic acid salts, inorganic salts, oxides, hydroxides, hydrides, alkoxides and quaternary ammonium hydroxides of alkali metals and alkali earth metals. These compounds may be used alone or in combination.

The alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salts, dipotassium salts, dicesium salts and dilithium salts of bisphenol A, and sodium salts, potassium salts, cesium salts and lithium salts of phenol.

The alkali earth metal compounds include magnesium hydroxide, potassium hydroxide, strontium hydroxide, barium hydroxide, magnesium carbonate, calcium carbonate, strontium carbonate, barium carbonate, magnesium diacetate, calcium diacetate, strontium diacetate and barium diacetate.

The nitrogen-containing compounds include quaternary ammonium hydroxides having an alkyl or aryl group, such as tetramethylammonium hydroxide, tetraethylammonium hydroxide, tetrapropylammonium hydroxide, tetrabutylammonium hydroxide and trimethylbenzylammonium hydroxide. Tertiary amines such as triethylamine, dimethylbenzylamine and triphenylamine, and imidazoles such as 2-methylimidazole, 2-phenylimidazole and benzimidazole are also included in the above examples. Bases and basic salts such as ammonia, tetramethylammonium borohydride, tetrabutylammonium borohydride, tetrabutylammonium tetraphenylborate and tetraphenylammonium tetraphenylborate are further included. The metal compounds include zinc aluminum compounds, germanium compounds, organic tin compounds, antimony compounds, manganese compounds, titanium compounds and zirconium compounds. These compounds may be used alone or in combination of two or more.

The amount of the polymerization catalyst is preferably $1 \times 10^{-9}$ to $1 \times 10^{-2}$ equivalent, preferably $1 \times 10^{-8}$ to $1 \times 10^{-5}$ equivalent, more preferably $1 \times 10^{-7}$ to $1 \times 10^{-3}$ equivalent based on 1 mole of the diol component.

The melt polycondensation reaction is carried out by distilling off a monohydroxy compound produced under heating and stirring in an inert gas atmosphere under reduced pressure as having already been known.

The reaction temperature is generally 120 to 350° C., and the degree of vacuum in the reaction system is increased to 10 to 0.1 Torr in the latter stage of the reaction to facilitate the distillation-off of the monohydroxy compound produced so as to complete the reaction. A terminal capping agent, an antioxidant and the like may be optionally added.

A catalyst deactivator may be added in the latter stage of the reaction. As the catalyst deactivated may be used known catalyst deactivators effectively. Out of these, ammonium salts and phosphonium salts of sulfonic acid are preferred. Salts of dodecylbenzenesulfonic acid such as tetrabutylphosphonium salts of dodecylbenzenesulfonic acid and salts of paratoluenesulfonic acid such as tetrabutylammonium salts of paratoluenesulfonic acid are more preferred.

Methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used as the esters of sulfonic acid. Out of these, tetrabutylphosphonium salts of dodecylbenzenesulfonic acid are most preferred. The amount of the catalyst deactivator is preferably 0.5 to 50 moles, more preferably 0.5 to 10 moles, much more preferably 0.8 to 5 moles based on 1 mole of the catalyst when at least one polymerization catalyst selected from an alkali metal compound and/or an alkali earth metal compound is used.

A heat stabilizer, plasticizer, optical stabilizer, polymerization metal inactivating agent, flame retardant, lubricant, antistatic agent, surfactant, antibacterial agent, ultraviolet absorbent and release agent may be used as required or according to application purpose.

<Optical Film>

The optical film of the present invention will be described hereinunder. This optical film is used for optical purposes. Stated more specifically, it is used as a retardation film, plastic cell substrate film, polarizing plate protective film, antireflection film, brightness increasing film, protective film for optical disks or diffusion film. It is particularly preferably used as a retardation film or a polarizing plate protective film.

To produce this optical film, conventionally known methods such as solution casting method, melt extrusion method, thermal pressing method and calendar method may be used. The melt extrusion method is preferred as the method of producing the optical film from the viewpoint of productivity.

In the melt extrusion method, preferably, the resin is extruded from a T die and supplied onto a cooling roll. The temperature at this point which is determined from the molecular weight, Tg and melt flowability of the polycarbonate copolymer is 180 to 350° C., preferably 200 to 320° C. When the temperature is lower than 180° C., the viscosity of the polymer becomes high, whereby the orientation and stress distortion of the polymer are apt to remain disadvantageously. When the temperature is higher than 350° C., such problems as thermal deterioration, coloration or the formation of a die line (streak) from the T die readily occur.

Since the polycarbonate copolymer used in the present invention has high solubility in an organic solvent, the solution casting method may also be employed. In the case of the solution casting method, methylene chloride, 1,2-dichloroethane, 1,1,2,2-tetrachloroethane, dioxolan and dioxane are preferably used as solvents. The amount of the residual solvent contained in the film used in the solution casting method is preferably not more than 2 wt %, more preferably not more than 1 wt %. When the amount of the residual solvent is larger than 2 wt %, a reduction in the glass transition temperature of the film becomes significant, which is not preferred from the viewpoint of heat resistance.

The thickness of the unstretched optical film of the present invention is in the range of preferably 30 to 400 μm, more preferably 40 to 300 μm. When the film is stretched to obtain a retardation film, the thickness of the film may be determined from the above range in consideration of the desired retardation value and thickness of the optical film.

The unstretched optical film obtained as described above is stretched and oriented to become a retardation film. The stretching method may be a conventional stretching method, for example, monoaxial stretching in the longitudinal direction, monoaxial stretching in the transverse direction by using a tenter, or simultaneous or sequential biaxial stretching which is a combination of these monoaxial stretchings. Although stretching is preferably carried out continuously from the viewpoint of productivity, it may be carried out in a batch manner. The stretching temperature is preferably (Tg−20° C.) to (Tg+50° C.) (Tg is the glass transition temperature of the polycarbonate copolymer), more preferably (Tg−10° C.) to (Tg+30° C.). Within this temperature range, the molecular motion of the polymer becomes moderate, relaxation hardly occurs by stretching, and the control of orientation becomes easy, thereby making it easy to obtain a desired Re value advantageously.

The draw ratio is determined by a target retardation value. The draw ratios in the longitudinal direction and the transverse direction are each preferably 1.05 to 5 times, more preferably 1.1 to 4 times. This stretching may be carried out in one stage or multiple stages. The above Tg when the film obtained by the solution casting method is to be stretched is the glass transition temperature of the film containing a trace amount of a solvent.

(Chromatic Dispersibility)

The optical film of the present invention is characterized in that the retardation within the plane of the film becomes smaller as the wavelength becomes shorter at a visible range of 400 to 800 nm. That is, the optical film satisfies the following expression (1).

$$R(450)<R(550)<R(650) \qquad (1)$$

R(450), R(550) and R(650) are retardation values within the plane of the film at wavelengths of 450 nm, 550 nm and 650 nm, respectively.

The retardation value R within the plane of the film is defined by the following equation and indicates a phase lag between the X direction of light passing in a direction perpendicular to the film and the Y direction perpendicular to the X direction.

$$R=(n_x-n_y)\times d$$

wherein $n_x$ is the refractive index of a lag phase axis (axis having the highest refractive index) within the plane of the film, $n_y$ is a refractive index in a direction perpendicular to $n_x$ within the plane of the film, and d is the thickness of the film.

(Thickness and the Like)

The thickness of the optical film of the present invention is preferably 20 to 200 μm, more preferably 20 to 150 μm. Within this range, the desired retardation value is easily obtained by stretching and film formation is easy advantageously.

The photoelastic constant of the polycarbonate copolymer constituting the optical film of the present invention is low. Therefore, a change in retardation caused by stress is small and a liquid crystal display comprising this retardation film has excellent display stability.

The optical film of the present invention has high transparency. The optical film having a thickness of 100 μm of the present invention has a total light transmittance of preferably not less than 85%, more preferably not less than 88%. The haze value of the optical film of the present invention is preferably not more than 5%, more preferably not more than 3%.

The film of the present invention can be used as a retardation film. The present invention includes a liquid crystal display comprising the above retardation film. The present invention also includes a circularly polarizing film comprising the film of the present invention and a polarizing layer. The present invention further includes a display element comprising the above circularly polarizing film as an antireflection film.

<Preferred Embodiments>

The following films (I) to (VI) are preferred embodiments of the present invention.

(Film (I))

The film (I) has so-called "reverse chromatic dispersibility" and satisfies the following expressions (2) and (3).

$$0 < R(450)/R(550) < 1 \quad (2)$$

$$1.01 < R(650)/R(550) < 2 \quad (3)$$

The film (I) is advantageously used as a retardation film for liquid crystal displays.

More preferably, the film (I) satisfies the following conditions.

$$0.6 < R(450)/R(550) < 1 \quad (2\text{-}1)$$

$$1.01 < R(650)/R(550) < 1.40 \quad (3\text{-}1)$$

Much more preferably, the film (I) satisfies the following conditions.

$$0.65 < R(450)/R(550) < 0.92 \quad (2\text{-}2)$$

$$1.01 < R(650)/R(550) < 1.30 \quad (3\text{-}2)$$

Particularly preferably, the film (I) satisfies the following conditions.

$$0.7 < R(450)/R(550) < 0.88 \quad (2\text{-}3)$$

$$1.04 < R(650)/R(550) < 1.20 \quad (3\text{-}3)$$

The retardation value R(550) within the plane of the film at a wavelength of 550 nm of the film (I) is preferably larger than 50 nm. The film (I) may be used alone as a broadband λ/4 plate or λ/2 plate without laminating another layer. For this application, it is desired that the λ/4 plate should satisfy 100 nm<R(550)<180 nm and that the λ/2 plate should satisfy 220 nm<R(550)<330 nm. As for chromatic dispersibility, a test sample having a length of 100 mm and a width of 70 mm is cut out from the film and stretched to 2.0 times in the longitudinal direction at a stretching temperature of (Tg+10° C.), and the obtained film is measured by the Spectroellipsometer M-220 of JASCO CORPORATION.

Preferably, the polycarbonate copolymer of the film (I) contains the unit (A1) represented by the following formula:

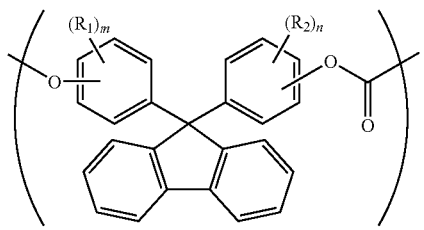

($R_1$, $R_2$, "m" and "n" are as defined hereinabove) and the unit (B) represented by the following formula:

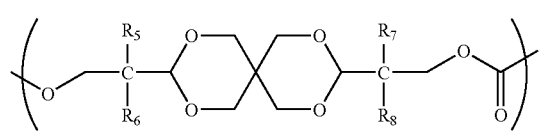

($R_5$ to $R_8$ are as defined hereinabove), the (A1/B) molar ratio of the unit (A1) to the unit (B) is 10/90 or more and less than 40/60, and the absolute value of photoelastic constant of the film is not more than $20 \times 10^{-12}$ $Pa^{-1}$.

The (A1/B) molar ratio of the unit (A1) to the unit (B) is more preferably 20/80 or more and less than 40/60.

Preferably, the polycarbonate copolymer of the film (I) contains the unit (A2) represented by the following formula:

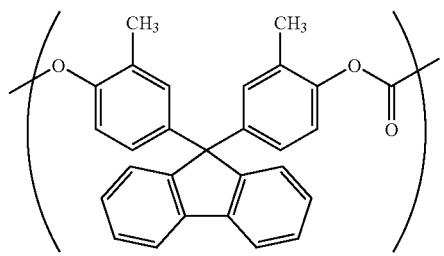

and the unit (B1) represented by the following formula:

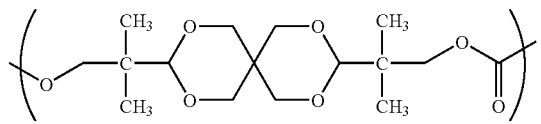

The (A2/B1) molar ratio of the unit (A2) to the unit (B1) is preferably 10/90 or more and less than 40/60, more preferably 20/80 or more and less than 40/60.

(Film (II))

The film (II) has so-called "reverse chromatic dispersibility" and satisfies the following expressions (2) and (3):

$$0 < R(450)/R(550) < 1 \quad (2)$$

$$1.01 < R(650)/R(550) < 2 \quad (3)$$

The film (II) is advantageously used as a retardation film for liquid crystal displays.

More preferably, the film (II) satisfies the following conditions.

$$0.6 < R(450)/R(550) < 1 \quad (2\text{-}1)$$

$$1.01 < R(650)/R(550) < 1.40 \quad (3\text{-}1)$$

Much more preferably, the film (II) satisfies the following conditions.

$$0.65 < R(450)/R(550) < 0.92 \quad (2\text{-}2)$$

$$1.01 < R(650)/R(550) < 1.30 \quad (3\text{-}2)$$

Particularly preferably, the film (II) satisfies the following conditions.

$$0.7 < R(450)/R(550) < 0.88 \quad (2\text{-}3)$$

$$1.04 < R(650)/R(550) < 1.20 \quad (3\text{-}3)$$

Preferably, the polycarbonate copolymer of the film (II) contains the unit (A3) represented by the following formula:

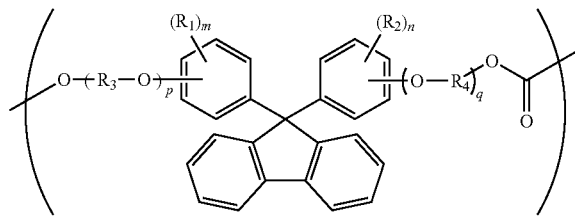

("p" and "q" are each independently an integer of 1 or more, and $R_1$, $R_2$, $R_3$, $R_4$, "m" and "n" are as defined hereinabove)

and the unit (B) represented by the following formula:

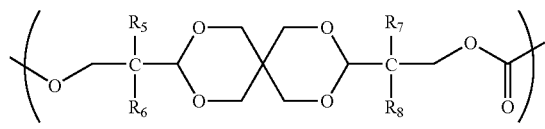

($R_5$ to $R_8$ are as defined hereinabove),
the (A3/B) molar ratio of the unit (A3) to the unit (B) is 10/90 or more and less than 65/35, and the absolute value of photoelastic constant of the film is not more than $25 \times 10^{-12}$ $Pa^{-1}$. The (A3/B) molar ratio of the unit (A3) to the unit (B) is more preferably 20/80 to 60/40.

Preferably, the polycarbonate copolymer of the film (II) contains the unit (A4) represented by the following formula:

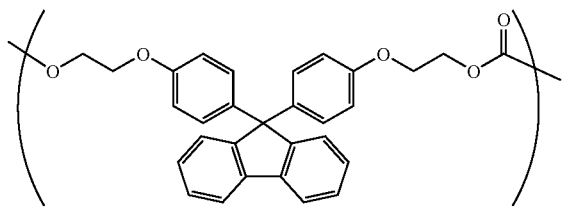

and the unit (B1) represented by the following formula:

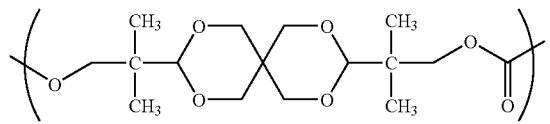

The (A4/B1) molar ratio of the unit (A4) to the unit (B1) is preferably 10/90 or more and less than 65/35, more preferably 20/80 to 60/40.

(Film (III))
The film (III) satisfies the following conditions (4) to (6).

$$R(450) < 0 \quad (4)$$

$$-10 < R(550) < 10 \quad (5)$$

$$0 < R(650) \quad (6)$$

Preferably, the film (III) satisfies the following conditions.

$$R(450) < 0 \quad (4\text{-}1)$$

$$-5 < R(550) < 5 \quad (5\text{-}1)$$

$$0 < R(650) \quad (6\text{-}1)$$

The film (III) has excellent transparency. The film (III) has low optical anisotropy. That is, the film (III) has a retardation value close to "0" within the plane of the film at a wavelength of 400 to 800 nm. Therefore, it may be used as a protective film for the polarizing plate of a liquid crystal display.

Preferably, the polycarbonate copolymer of the film (III) contains the unit (A1) represented by the following formula:

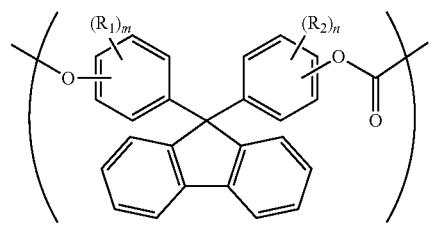

($R_1$, $R_2$, "m" and "n" are as defined hereinabove) and the unit (B) represented by the following formula:

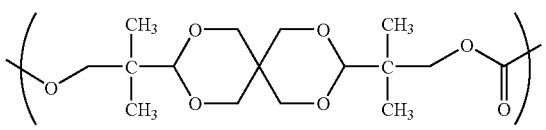

($R_5$ to $R_8$ are as defined hereinabove),
the (A1/B) molar ratio of the unit (A1) to the unit (B) is 40/60 or more and less than 60/40, and the absolute value of photoelastic constant of the film is not more than $25 \times 10^{-12}$ $Pa^{-1}$. The (A1/B) molar ratio of the unit (A1) to the unit (B) is more preferably 45/55 to 55/45.

Preferably, the polycarbonate copolymer of the film (III) contains the unit (A2) represented by the following formula:

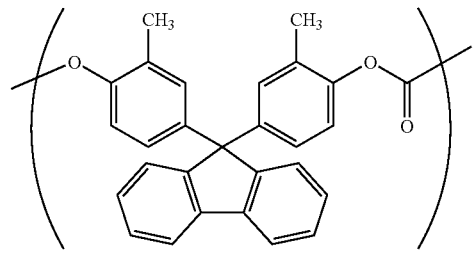

and the unit (B1) represented by the following formula:

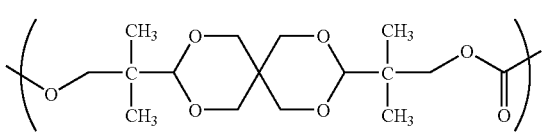

The (A2/B1) molar ratio of the unit (A2) to the unit (B1) is preferably 40/60 or more and less than 60/40, more preferably 45/55 to 55/45.

(Film (IV))

The film (IV) satisfies the following conditions (4) to (6).

$$R(450) < 0 \quad (4)$$

$$-10 < R(550) < 10 \quad (5)$$

$$0 < R(650) \quad (6)$$

Preferably, the film (IV) satisfies the following conditions.

$$R(450) < 0 \quad (4\text{-}1)$$

$$-5 < R(550) < 5 \quad (5\text{-}1)$$

$$0 < R(650) \quad (6\text{-}1)$$

The film (IV) has excellent transparency. The film (IV) has low optical anisotropy. That is, the film (IV) has a retardation value close to "0" within the plane of the film at a wavelength of 400 to 800 nm. Therefore, it may be used as a protective film for the polarizing plate of a liquid crystal display.

Preferably, the polycarbonate copolymer of the film (IV) contains the unit (A3) represented by the following formula:

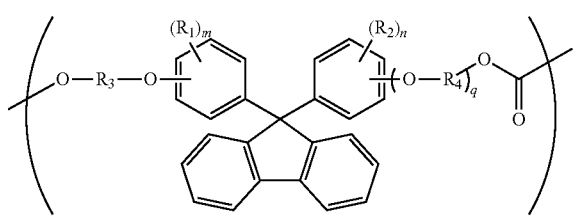

("p" and "q" are each independently an integer of 1 or more, and $R_1$, $R_2$, $R_3$, $R_4$, "m" and "n" are as defined hereinabove)

and the unit (B) represented by the following formula:

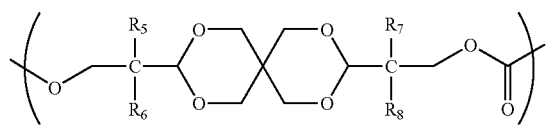

($R_5$ to $R_8$ are as defined hereinabove), the (A3/B) molar ratio of the unit (A3) to the unit (B) is 65/35 or more and less than 82/18, and the absolute value of photoelastic constant of the film is not more than $30 \times 10^{-12}$ $Pa^{-1}$. The (A3/B) molar ratio of the unit (A3) to the unit (B) is more preferably 65/35 to 80/20.

Preferably, the polycarbonate copolymer contains the unit (A4) represented by the following formula:

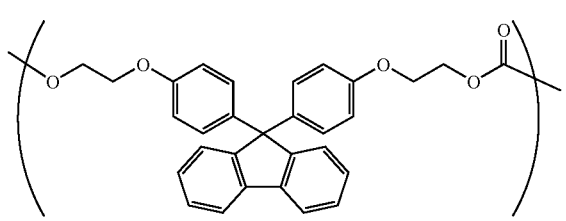

and the unit (B1) represented by the following formula:

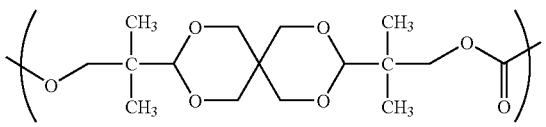

The (A4/B1) molar ratio of the unit (A4) to the unit (B1) is preferably 65/35 or more and less than 82/18, more preferably 65/35 to 80/20.

(Film (V))

The film (V) preferably satisfies the following condition.

$$R(450) < R(550) < R(650) < 0 \quad (7)$$

Since the film (V) has negative birefringence, it is suitable for use as a retardation film for in-plane switching (IPS) mode liquid crystal displays.

Preferably, the polycarbonate copolymer of the film (V) contains the unit (A1) represented by the following formula:

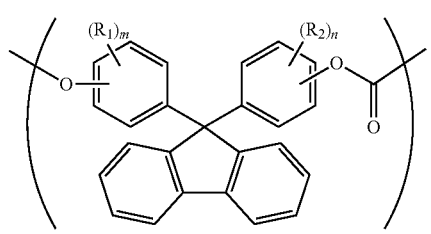

($R_1$, $R_2$, "m" and "n" are as defined hereinabove) and the unit (B) represented by the following formula:

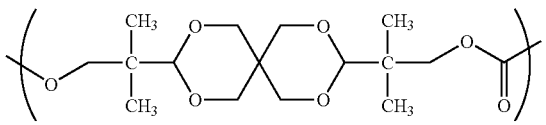

($R_5$ to $R_8$ are as defined hereinabove), the (A1/B) molar ratio of the unit (A1) to the unit (B) is 60/40 to 90/10, and the absolute value of photoelastic constant of the film is not more than $30 \times 10^{-12}$ $Pa^{-1}$. The (A1/B) molar ratio of the unit (A1) to the unit (B) is more preferably 65/35 to 90/10.

Preferably, the polycarbonate copolymer of the film (V) contains the unit (A2) represented by the following formula:

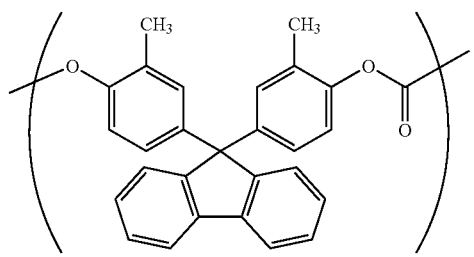

and the unit (B1) represented by the following formula:

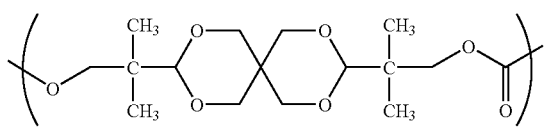

The (A2/B1) molar ratio of the unit (A2) to the unit (B1) is preferably 60/40 to 90/10, more preferably 65/35 to 90/10.

(Film (VI))

The film (VI) preferably satisfies the following condition.

$$R(450) < R(550) < R(650) < 0 \qquad (7)$$

Since the film (VI) has negative birefringence, it is suitable for use as a retardation film for in-plane switching (IPS) mode liquid crystal displays.

Preferably, the polycarbonate copolymer of the film (VI) contains the unit (A3) represented by the following formula:

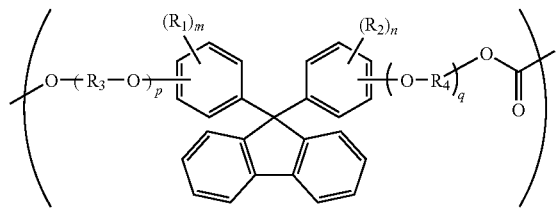

("p" and "q" are each independently an integer of 1 or more, and $R_1$, $R_2$, $R_3$, $R_4$, "m" and "n" are as defined hereinabove)

and the unit (B) represented by the following formula:

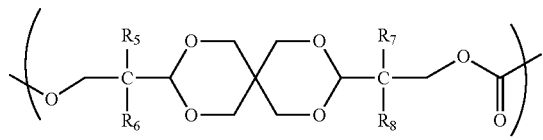

($R_5$ to $R_8$ are as defined hereinabove), the (A3/B) molar ratio of the unit (A3) to the unit (B) is 82/18 to 90/10, and the absolute value of photoelastic constant of the film is not more than $30 \times 10^{-12}$ Pa$^{-1}$.

Preferably, the polycarbonate copolymer of the film (VI) contains the unit (A4) represented by the following formula:

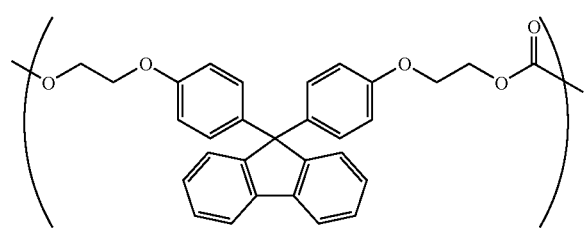

and the unit (B1) represented by the following formula:

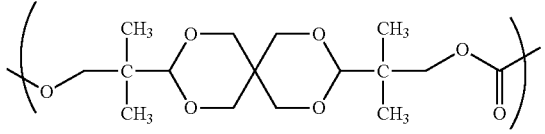

The (A4/B1) molar ratio of the unit (A4) to the unit (B1) is preferably 82/18 to 90/10.

EXAMPLES

The following examples are provided for the purpose of further illustrating the present invention but are in no way to be taken as limiting. "Parts" in the Examples means "parts by weight". Resins and evaluation methods used in the Examples are as follows.

1. Measurement of Photoelastic Constant

A test sample having a length of 50 mm and a width of 10 mm was cut out from the film to measure its photoelastic constant by using the Spectroellipsometer M-220 of JASCO CORPORATION.

2. Measurement of Retardation and Chromatic Dispersibility

A test sample having a length of 100 mm and a width of 70 mm was cutout from the film and stretched to 2.0 times at a stretching temperature of Tg+10° C. to measure its retardation and chromatic dispersibility by using the Spectroellipsometer M-220 of JASCO CORPORATION.

3. Measurement of Tg (Glass Transition Temperature)

This was measured in a nitrogen atmosphere at a temperature elevation rate of 20° C./min by using the 2910 DSC of TA Instruments. Japan.

4. 5% Weight Loss Temperature by Heat (Td)

Thermogravimetric measurement was made in a nitrogen stream having a rate of 40 ml/min at a temperature elevation rate of 20° C./min by using the TGA 951 thermogravimetric analyzer of E.I. Du Pont De Nemours & Co. to obtain a temperature at the time of a 5% weight loss.

5. Polymer Composition Ratio (NMR)

This was measured by the proton NMR of the JNM-AL400 of JEOL Ltd. to calculate the composition ratio of the polymer.

6. Viscosity Average Molecular Weight

The viscosity average molecular weight was obtained by inserting the specific viscosity ($\eta_{sp}$) of a solution obtained by dissolving 0.7 g of a polycarbonate resin in 100 mL of methylene chloride measured at 20° C. into the following equation.

$\eta_{sp}/c = [\eta] + 0.45 \times [\eta]^2 c$ ([$\eta$] is an intrinsic viscosity)

$[\eta] = 1.23 \times 10^{-4} M^{0.83}$ $c = 0.7$

Example 1

Production of Polycarbonate Copolymer 109.45 parts of 3,9-bis(2-hydroxy-1,1-dimethylethyl)-2,4,8,10-tetraoxaspiro[5.5]undecane (to be referred to as "spiroglycol" hereinafter), 15.12 parts of 9,9-bis(4-hydroxy-3-methylphenyl)fluorene (to be referred to as "BCF" hereinafter), 89.29 parts of diphenyl carbonate, and $1.8 \times 10^{-2}$ part of tetramethylammonium hydroxide and $1.6 \times 10^{-4}$ part of sodium hydroxide as catalysts were heated at 180° C. in a nitrogen atmosphere to be molten. Thereafter, the degree of vacuum was set to 13.4 kPa over 30 minutes. Then, the temperature was raised to 260° C. at a rate of 20° C./hr and maintained at that temperature for 10 minutes, and the degree of vacuum was set to 133 Pa or less over 1 hour. A reaction was carried out under agitation for a total of 6 hours.

After the end of the reaction, tetrabutylphosphonium dodecylbenzenesulfonate was added in an amount 4 times the total molar amount of the catalysts to deactivate the catalysts, and the resulting product was discharged from the bottom of a reaction tank under increased nitrogen pressure and cut with a pelletizer while it was cooled in a water tank to obtain a pellet. The composition ratio of the pellet was measured by NMR.

<Production of Optical Film>

Subsequently, a T die having a width of 150 mm and a lip width of 500 µm and a film take-up device were set in the 15 φ double-screw extrusion kneader of Technovel Corporation, and the obtained polycarbonate copolymer was molded into a film to obtain a transparent extruded film. A sample measuring 50 mm×10 mm was cut out from a portion having a thickness of 66±0.8 µm around the center of the obtained film to measure its photoelastic constant. A sample having a length of 100 mm and a width of 70 mm cut out likewise was stretched to 2.0 times monoaxially in the longitudinal direction at 120° C. (Tg+10° C.) to obtain a stretched film having a length of 200 mm, a width of 56 mm and a thickness of 47 µm. The retardation and chromatic dispersibility of this stretched film were measured. The results are shown in Table 1.

Example 2

Production of Polycarbonate Copolymer

The operation of Example 1 was repeated except that 103.37 parts of spiroglycol, 22.68 parts of BCF and 89.29 parts of diphenyl carbonate were used to obtain an aromatic-aliphatic copolycarbonate. The composition ratio of the copolycarbonate was measured by NMR.

<Production of Optical Film>

A film (thickness of 60±0.8 µm) was produced in the same manner as in Example 1. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 42 µm, and the retardation and chromatic dispersibility of the obtained film were measured. The results are shown in Table 1.

Example 3

Production of Polycarbonate Copolymer

The operation of Example 1 was repeated except that 97.29 parts of spiroglycol, 30.24 parts of BCF and 89.29 parts of diphenyl carbonate were used to obtain an aromatic-aliphatic copolycarbonate. The composition ratio of the copolycarbonate was measured by NMR.

<Production of Optical Film>

A film (thickness of 61±0.7 µm) was produced in the same manner as in Example 1. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 42 µm, and the retardation and chromatic dispersibility of the obtained film were measured. The results are shown in Table 1.

Example 4

Production of Polycarbonate Copolymer

The operation of Example 1 was repeated except that 85.12 parts of spiroglycol, 45.36 parts of BCF and 89.29 parts of diphenyl carbonate were used to obtain an aromatic-aliphatic copolycarbonate. The viscosity average molecular weight of the obtained pellet was 19,000. The composition ratio of the pellet was measured by NMR.

<Production of Optical Film>

This copolymer was dissolved in methylene chloride to produce a dope having a solid content of 19 wt %. A cast film (thickness of 61±0.8 µm) was produced from this dope solution by a known method. The viscosity average molecular weight of the obtained film was 19,000 and there was no difference in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 43 µm, and the retardation and chromatic dispersibility of the obtained film were measured. The results are shown in Tables 1 and 2.

Example 5

Production of Polycarbonate Copolymer

The operation of Example 1 was repeated except that 80.26 parts of spiroglycol, 51.41 parts of BCF and 89.29 parts of diphenyl carbonate were used to obtain an aromatic-aliphatic copolycarbonate. The viscosity average molecular weight of the obtained pellet was 19,200. The composition ratio of the pellet was measured by NMR.

<Production of Optical Film>

A film (thickness of 75±0.8 µm) was produced in the same manner as in Example 1. The viscosity average molecular weight of the obtained film was 19,100 and there was almost no difference (100) in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 45 µm, and the retardation and chromatic dispersibility of the obtained film were measured. The results are shown in Tables 1 and 2.

Example 6

Production of Polycarbonate Copolymer

The operation of Example 1 was repeated except that 77.82 parts of spiroglycol, 54.43 parts of BCF and 89.29 parts of diphenyl carbonate were used to obtain an aromatic-aliphatic copolycarbonate. The viscosity average molecular weight of the obtained pellet was 19,600. The composition ratio of the pellet was measured by NMR.

<Production of Optical Film>

A film (thickness of 70±0.8 µm) was produced in the same manner as in Example 1. The viscosity average molecular weight of the obtained film was 19,400 and there was almost no difference (200) in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 42 µm, and the retardation and chromatic dispersibility of the obtained film were measured. The results are shown in Tables 1 and 2.

Example 7

Production of Polycarbonate Copolymer

The operation of Example 1 was repeated except that 75.39 parts of spiroglycol, 57.46 parts of BCF and 89.29 parts of diphenyl carbonate were used to obtain an aromatic-aliphatic copolycarbonate. The viscosity average molecular weight of the obtained pellet was 19,400. The composition ratio of the pellet was measured by NMR.

<Production of Optical Film>

A film (thickness of 78±0.8 µm) was produced in the same manner as in Example 1. The viscosity average molecular weight of the obtained film was 19,400 and there was no difference in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 42 µm, and the retardation and chromatic dispersibility of the obtained film were measured. The results are shown in Tables 1 and 2.

Example 8

Production of Polycarbonate Copolymer

The operation of Example 1 was repeated except that 72.97 parts of spiroglycol, 60.49 parts of BCF and 89.29 parts of diphenyl carbonate were used to obtain an aromatic-aliphatic copolycarbonate. The viscosity average molecular weight of the obtained pellet was 19,200. The composition ratio of the pellet was measured by NMR.

<Production of Optical Film>

A film (thickness of 67±0.8 µm) was produced in the same manner as in Example 1. The viscosity average molecular weight of the obtained film was 19,200 and there was no difference in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 42 µm, and the retardation and chromatic dispersibility of the obtained film were measured. The results are shown in Tables 1 and 2.

Example 9

Production of Polycarbonate Copolymer

The operation of Example 1 was repeated except that 85.13 parts of spiroglycol, 52.63 parts of 9,9-bis[4-(2-hydroxyethoxy)phenyl]fluorene (to be referred to as BPEF hereinafter) and 89.29 parts of diphenyl carbonate were used to obtain an aromatic-aliphatic copolycarbonate. The composition ratio of the copolycarbonate was measured by NMR.

<Production of Optical Film>

A film (thickness of 66±0.8 µm) was produced in the same manner as in Example 1. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 1.

Example 10

Production of Polycarbonate Copolymer

The operation of Example 1 was repeated except that 72.96 parts of spiroglycol, 70.16 parts of BPEF and 89.29 parts of diphenyl carbonate were used to obtain an aromatic-aliphatic copolycarbonate. The viscosity average molecular weight of the obtained pellet was 18,800. The composition ratio of the pellet was measured by NMR.

<Production of Optical Film>

A film (thickness of 102±0.7 µm) was produced in the same manner as in Example 1. The viscosity average molecular weight of the obtained film was 18,600 and there was almost no difference (200) in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 68 µm, and the retardation and chromatic dispersibility of the obtained film were measured. The results are shown in Tables 1 and 2.

Example 11

Production of Polycarbonate Copolymer

The operation of Example 1 was repeated except that 66.88 parts of spiroglycol, 78.93 parts of BPEF and 89.29 parts of diphenyl carbonate were used to obtain an aromatic-aliphatic copolycarbonate. The viscosity average molecular weight of the obtained pellet was 17,700. The composition ratio of the pellet was measured by NMR.

<Production of Optical Film>

A film (thickness of 98±0.8 µm) was produced in the same manner as in Example 1. The viscosity average molecular weight of the obtained film was 17,400 and there was almost no difference (300) in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 61 µm, and the retardation and chromatic dispersibility of the obtained film were measured. The results are shown in Tables 1 and 2.

Example 12

Production of Polycarbonate Copolymer

The operation of Example 1 was repeated except that 60.8 parts of spiroglycol, 87.7 parts of BPEF and 89.29 parts of diphenyl carbonate were used to obtain an aromatic-aliphatic copolycarbonate. The viscosity average molecular weight of the obtained pellet was 18,800. The composition ratio of the pellet was measured by NMR.
<Production of Optical Film>
A film (thickness of 88±0.8 μm) was produced in the same manner as in Example 1. The viscosity average molecular weight of the obtained film was 18,600 and there was almost no difference (200) in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 59 μm, and the retardation and chromatic dispersibility of the obtained film were measured. The results are shown in Tables 1 and 2.

Example 13

Production of Polycarbonate Copolymer

The operation of Example 1 was repeated except that 54.72 parts of spiroglycol, 96.47 parts of BPEF and 89.29 parts of diphenyl carbonate were used to obtain an aromatic-aliphatic copolycarbonate. The viscosity average molecular weight of the obtained pellet was 19,200. The composition ratio of the pellet was measured by NMR.
<Production of Optical Film>
A film (thickness of 93±0.8 μm) was produced in the same manner as in Example 4. The viscosity average molecular weight of the obtained film was 19,200 and there was no difference in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 60 μm, and the retardation and chromatic dispersibility of the obtained film were measured. The results are shown in Tables 1 and 2.

Example 14

Production of Polycarbonate Copolymer

The operation of Example 1 was repeated except that 48.64 parts of spiroglycol, 105.24 parts of BPEF and 89.29 parts of diphenyl carbonate were used to obtain an aromatic-aliphatic copolycarbonate. The viscosity average molecular weight of the obtained pellet was 19,200. The composition ratio of the pellet was measured by NMR.
<Production of Optical Film>
A film (thickness of 162±0.7 μm) was produced in the same manner as in Example 4. The viscosity average molecular weight of the obtained film was 19,200 and there was no difference in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 98 μm, and the retardation and chromatic dispersibility of the obtained film were measured. The results are shown in Tables 1 and 2.

Example 15

Production of Polycarbonate Copolymer

The operation of Example 1 was repeated except that 64.46 parts of spiroglycol, 71.03 parts of BCF and 89.29 parts of diphenyl carbonate were used to obtain an aromatic-aliphatic copolycarbonate. The composition ratio of the copolycarbonate was measured by NMR.
<Production of Optical Film>
A film (thickness of 67±0.8 μm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 μm, and the retardation and chromatic dispersibility of the obtained film were measured. The results are shown in Table 3.

Example 16

Production of Polycarbonate Copolymer

The operation of Example 1 was repeated except that 60.81 parts of spiroglycol, 75.61 parts of BCF and 89.29 parts of diphenyl carbonate were used to obtain an aromatic-aliphatic copolycarbonate. The composition ratio of the copolycarbonate was measured by NMR.
<Production of Optical Film>
A film (thickness of 66±0.8 μm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 μm, and the retardation and chromatic dispersibility of the obtained film were measured. The results are shown in Table 3.

Example 17

Production of Polycarbonate Copolymer

The operation of Example 1 was repeated except that 57.16 parts of spiroglycol, 80.15 parts of BCF and 89.29 parts of diphenyl carbonate were used to obtain an aromatic-aliphatic copolycarbonate. The composition ratio of the copolycarbonate was measured by NMR.
<Production of Optical Film>
A film (thickness of 68±0.8 μm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 48 μm, and the retardation and chromatic dispersibility of the obtained film were measured. The results are shown in Table 3.

Example 18

Production of Polycarbonate Copolymer

The operation of Example 1 was repeated except that 24.32 parts of spiroglycol, 140.34 parts of BPEF and 89.29 parts of diphenyl carbonate were used to obtain an aromatic-aliphatic copolycarbonate. The composition ratio of the copolycarbonate was measured by NMR.
<Production of Optical Film>
A film (thickness of 67±0.8 μm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 3.

Example 19

Production of Polycarbonate Copolymer

The operation of Example 1 was repeated except that 36.48 parts of spiroglycol, 122.80 parts of BPEF and 89.29 parts of diphenyl carbonate were used to obtain an aromatic-aliphatic copolycarbonate. The composition ratio of the copolycarbonate was measured by NMR.
<Production of Optical Film>
A film (thickness of 68±0.8 µm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 3.

Example 20

Production of Polycarbonate Copolymer

The operation of Example 1 was repeated except that 12.16 parts of spiroglycol, 136.1 parts of BCF and 89.29 parts of diphenyl carbonate were used to obtain an aromatic-aliphatic copolycarbonate. The composition ratio of the copolycarbonate was measured by NMR.
<Production of Optical Film>
A film (thickness of 68±0.8 µm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 4.

Example 21

Production of Polycarbonate Copolymer

The operation of Example 1 was repeated except that 18.24 parts of spiroglycol, 128.54 parts of BCF and 89.29 parts of diphenyl carbonate were used to obtain an aromatic-aliphatic copolycarbonate. The composition ratio of the copolycarbonate was measured by NMR.
<Production of Optical Film>
A film (thickness of 67±0.8 µm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 4.

Example 22

Production of Polycarbonate Copolymer

The operation of Example 1 was repeated except that 24.32 parts of spiroglycol, 120.98 parts of BCF and 89.29 parts of diphenyl carbonate were used to obtain an aromatic-aliphatic copolycarbonate. The composition ratio of the copolycarbonate was measured by NMR.
<Production of Optical Film>
A film (thickness of 67±0.8 µm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 4.

Example 23

Production of Polycarbonate Copolymer

The operation of Example 1 was repeated except that 12.16 parts of spiroglycol, 157.88 parts of BPEF and 89.29 parts of diphenyl carbonate were used to obtain an aromatic-aliphatic copolycarbonate. The composition ratio of the copolycarbonate was measured by NMR.
<Production of Optical Film>
A film (thickness of 68±0.8 µm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 4.

Example 24

Production of Polycarbonate Copolymer

The operation of Example 1 was repeated except that 18.24 parts of spiroglycol, 149.11 parts of BPEF and 89.29 parts of diphenyl carbonate were used to obtain an aromatic-aliphatic copolycarbonate. The composition ratio of the copolycarbonate was measured by NMR.
<Production of Optical Film>
A film (thickness of 67±0.8 µm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 47 µm, and the retardation and chromatic dispersibility of the obtained film were measured. The results are shown in Table 4.

Comparative Example 1

Production of Optical Film

A film (thickness of 74 (±0.8) µm) was produced in the same manner as in Example 1 except that a polycarbonate resin (Panlite AD-5503 (viscosity average molecular weight of 15,200) of Teijin Chemicals Ltd.) obtained from 2,2-bis(4-hydroxyphenyl)propane (BPA) was used. The viscosity average molecular weight of the obtained film was 15,100 and there was almost no difference (100) in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 56 mm and a thickness of 41 μm, and the retardation and chromatic dispersibility of the obtained film were measured. The results are shown in Tables 1, 2 and 3. This film had a high photoelastic constant of $80 \times 10^{-12}$ $Pa^{-1}$ and large stress birefringence. Therefore, light slipping occurs disadvantageously when it is used as a retardation film. Since the chromatic dispersibility of the film is positive, λ/4 is not obtained at a broad band and a problem such as color slipping occurs.

Comparative Example 2

Production of Polycarbonate Copolymer 9,809 parts of ion exchange water and 2,271 parts of a 48% aqueous solution of sodium hydroxide were added to a reactor equipped with a thermometer, stirrer and reflux condenser, 585 parts of 2,2-bis(4-hydroxyphenyl)propane, 1,969 parts of 9,9-bis(4-hydroxy-3-methylphenyl)fluorene and 4.5 parts of sodium hydrosulfite were dissolved in the resulting solution, 6,604 parts of methylene chloride was added, and 1,000 parts of phosgene was blown into the obtained solution at 16 to 20° C. under agitation for 60 minutes. After the end of the blowing of phosgene, 70 parts of p-tert-butylphenol and 327 parts of a 48% aqueous solution of sodium hydroxide were added, and further 1.57 parts of triethylamine was added and stirred at 20 to 27° C. for 40 minutes to terminate a reaction. A methylene chloride layer containing the product was washed with diluted hydrochloric acid and pure water, and methylene chloride was evaporated to obtain a polycarbonate copolymer having a fluorene skeleton. The viscosity average molecular weight of the obtained powder was 38,200. The composition ratio of the powder was measured by NMR.

<Production of Optical Film>

A film (thickness of 164 (±0.8) μm) was produced in the same manner as in Example 4. The viscosity average molecular weight of the obtained film was 38,200 and there was no difference in viscosity average molecular weight between the pellet and the film. The photoelastic constant of the obtained film was evaluated in the same manner as in Example 1. The film was stretched to 2.0 times monoaxially at Tg+10° C. like Example 1 to obtain a stretched film having a length of 200 mm, a width of 56 mm and a thickness of 100 μm, and the retardation and chromatic dispersibility of the obtained film were measured. The results are shown in Tables 1 and 2. This film had a high photoelastic constant of $42 \times 10^{-12}$ $Pa^{-1}$ and large stress birefringence. Therefore, light slipping occurs disadvantageously when it is used as a retardation film.

Comparative Example 3

Production of Polycarbonate Copolymer

The operation of Example 1 was repeated except that 7.67 parts of isosorbide (ISS), 24.2 parts of spiroglycol, 6.81 parts of BCF and 32.45 parts of diphenyl carbonate were used to obtain a polycarbonate copolymer. The viscosity average molecular weight of the obtained pellet was 16,300. The composition ratio of the pellet was measured by NMR.

<Production of Optical Film>

A film (thickness of 78 (±0.8) μm) was produced in the same manner as in Example 1. The viscosity average molecular weight of the obtained film was 14,600 and the difference in viscosity average molecular weight between the pellet and the film was 1,700. The photoelastic constant of the obtained film was evaluated in the same manner as in Example 1. The film was stretched to 2.0 times monoaxially at Tg+10° C. like Example 1 to obtain a stretched film having a length of 200 mm, a width of 57 mm and a thickness of 48 μm, and the retardation and chromatic dispersibility of the obtained film were measured. The results are shown in Tables 1 and 2.

This film had a low 5% weight loss temperature of 356° C., and the reduction of molecular weight occurred at the time of forming this film disadvantageously. Since this film was made of a terpolymer, a great shift occurred in the composition of monomers including fluorene disadvantageously.

Comparative Example 4

Production of Polycarbonate Copolymer 9,809 parts of ion exchange water and 2,271 parts of a 48% aqueous solution of sodium hydroxide were added to a reactor equipped with a thermometer, stirrer and reflux condenser, 461 parts of 2,2-bis(4-hydroxyphenyl)propane, 2,175 parts of 9,9-bis(4-hydroxy-3-methylphenyl)fluorene and 4.5 parts of sodium hydrosulfite were dissolved in the resulting solution, 6,604 parts of methylene chloride was added, and 1,000 parts of phosgene was blown into the obtained solution at 16 to 20° C. under agitation for 60 minutes. After the end of the blowing of phosgene, 70 parts of p-tert-butylphenol and 327 parts of a 48% aqueous solution of sodium hydroxide were added, and further 1.57 parts of triethylamine was added and stirred at 20 to 27° C. for 40 minutes to terminate a reaction. A methylene chloride layer containing the product was washed with diluted hydrochloric acid and pure water, and methylene chloride was evaporated to obtain a polycarbonate copolymer having a fluorene skeleton. The composition ratio of the polycarbonate copolymer was measured by NMR.

<Production of Optical Film>

A film (thickness of 164 (±0.8) μm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 56 mm and a thickness of 100 μm, and the retardation and chromatic dispersibility of the obtained film were measured. The results are shown in Table 3. This film had a high photoelastic constant of $44 \times 10^{-12}$ $Pa^{-1}$ and large stress birefringence. Therefore, when it is used as a retardation film, light slipping occurs disadvantageously.

Comparative Example 5

Production of Polycarbonate Copolymer 9,809 parts of ion exchange water and 2,271 parts of a 48% aqueous solution of sodium hydroxide were added to a reactor equipped with a thermometer, stirrer and reflux condenser, 337 parts of 2,2-bis(4-hydroxyphenyl)propane, 2,280 parts of 9,9-bis(4-hydroxy-3-methylphenyl)fluorene and 4.5 parts of sodium hydrosulfite were dissolved in the resulting solution, 6,604 parts of methylene chloride was added, and 1,000 parts of phosgene was blown into the obtained solution at 16 to 20° C. under agitation for 60 minutes. After the end of the blowing of phosgene, 70 parts of p-tert-butylphenol and 327 parts of a 48% aqueous solution of sodium hydroxide were added, and further 1.57 parts of triethylamine was added and stirred at 20 to 27° C. for 40 minutes to terminate a reaction. A methylene chloride layer containing the product was washed with diluted hydrochloric acid and pure water, and methylene chloride was evaporated to obtain a polycarbonate copolymer having a fluorene skeleton. The composition ratio of the polycarbonate copolymer was measured by NMR.

<Production of Optical Film>

A film (thickness of 164 (±0.8) μm) was produced in the same manner as in Example 4. The photoelastic constant of the obtained film was evaluated in the same manner as in Example 1. The film was stretched to 2.0 times monoaxially at Tg+10° C. like Example 1 to obtain a stretched film having a length of 200 mm, a width of 56 mm and a thickness of 100 μm, and the retardation and chromatic dispersibility of the obtained film were measured. The results are shown in Table 4. This film had a high photoelastic constant of $42 \times 10^{-12}\,Pa^{-1}$ and large stress birefringence. Therefore, when it is used as a retardation film, light slipping occurs disadvantageously.

TABLE 1

| | BCF mol % | BPEF mol % | SPG mol % | BPA mol % | ISS mol % | Tg °C. | Photoelastic constant $10^{-12}\,Pa^{-1}$ | Td °C. | R(450) nm | R(550) nm | R(650) nm | R(450)/R(550) | R(650)/R(550) |
|---|---|---|---|---|---|---|---|---|---|---|---|---|---|
| Ex. 1 | 10 | — | 90 | — | — | 110 | 9 | 404 | 210 | 213 | 214 | 0.988 | 1.007 |
| Ex. 2 | 15 | — | 85 | — | — | 116 | 10 | 403 | 200 | 204 | 206 | 0.978 | 1.009 |
| Ex. 3 | 20 | — | 80 | — | — | 123 | 11 | 405 | 184 | 193 | 196 | 0.951 | 1.017 |
| Ex. 4 | 30 | — | 70 | — | — | 133 | 14 | 406 | 170 | 188 | 195 | 0.906 | 1.037 |
| Ex. 5 | 34 | — | 66 | — | — | 135 | 15 | 404 | 155 | 175 | 184 | 0.884 | 1.053 |
| Ex. 6 | 36 | — | 64 | — | — | 138 | 15 | 406 | 135 | 157 | 166 | 0.857 | 1.058 |
| Ex. 7 | 38 | — | 62 | — | — | 140 | 15 | 407 | 109 | 131 | 140 | 0.83 | 1.068 |
| Ex. 8 | 40 | — | 60 | — | — | 146 | 16 | 407 | 99 | 123 | 132 | 0.808 | 1.071 |
| Ex. 9 | — | 30 | 70 | — | — | 115 | 16 | 401 | 144 | 152 | 157 | 0.95 | 1.03 |
| Ex. 10 | — | 40 | 60 | — | — | 122 | 19 | 402 | 128 | 138 | 144 | 0.93 | 1.04 |
| Ex. 11 | — | 45 | 55 | — | — | 125 | 21 | 401 | 118 | 134 | 139 | 0.88 | 1.04 |
| Ex. 12 | — | 50 | 50 | — | — | 128 | 23 | 396 | 105 | 121 | 126 | 0.87 | 1.04 |
| Ex. 13 | — | 55 | 45 | — | — | 130 | 23 | 398 | 95 | 112 | 119 | 0.85 | 1.06 |
| Ex. 14 | — | 60 | 40 | — | — | 133 | 24 | 398 | 75 | 96 | 104 | 0.78 | 1.08 |
| C. Ex. 1 | — | — | — | 100 | — | 158 | 80 | 512 | 268 | 248 | 241 | 1.08 | 0.97 |
| C. Ex. 2 | 67 | — | — | 33 | — | 225 | 42 | 479 | 144 | 178 | 190 | 0.81 | 1.07 |
| C. Ex. 3 | 12 | — | 53 | — | 35 | 138 | 13 | 356 | 125 | 132 | 134 | 0.946 | 1.014 |

Ex.: Example

C. Ex.: Comparative Example

TABLE 2

| | BCF mol % | BPEF mol % | SPG mol % | BPA mol % | ISS mol % | Viscosity average molecular weight (pellet) | Viscosity average molecular weight (film) | Reduction of viscosity average molecular weight | Difference between BCF charge ratio and composition ratio | Film production method |
|---|---|---|---|---|---|---|---|---|---|---|
| Ex. 4 | 30 | — | 70 | — | — | 19000 | 19000 | 0 | 0.2 | Casting |
| Ex. 5 | 34 | — | 66 | — | — | 19200 | 19100 | Δ100 | 0.2 | Melt film formation |
| Ex. 6 | 36 | — | 64 | — | — | 19600 | 19400 | Δ200 | 0.3 | Melt film formation |
| Ex. 7 | 38 | — | 62 | — | — | 19400 | 19400 | 0 | 0.2 | Casting |
| Ex. 8 | 40 | — | 60 | — | — | 19200 | 19200 | 0 | 0.2 | Casting |
| Ex. 10 | — | 40 | 60 | — | — | 18800 | 18600 | Δ200 | 0.2 | Melt film formation |
| Ex. 11 | — | 45 | 55 | — | — | 17700 | 17400 | Δ300 | 0.3 | Melt film formation |
| Ex. 12 | — | 50 | 50 | — | — | 18800 | 18600 | Δ200 | 0.2 | Melt film formation |
| Ex. 13 | — | 55 | 45 | — | — | 19200 | 19200 | 0 | 0.3 | Casting |
| Ex. 14 | — | 60 | 40 | — | — | 19200 | 19200 | 0 | 0.2 | Casting |
| C. Ex. 1 | — | — | — | 100 | — | 15200 | 15100 | Δ100 | — | Melt film formation |
| C. Ex. 2 | 67 | — | — | 33 | — | 38200 | 38200 | 0 | 0.3 | Casting |
| C. Ex. 3 | 12 | — | 53 | — | 35 | 16300 | 14600 | Δ1700 | 0.8 | Melt film formation |

Ex.: Example

C. Ex.: Comparative Example

TABLE 3

| | BCF mol % | BPEF mol % | SPG mol % | BPA mol % | Tg °C | Photoelastic constant $10^{-12}$ Pa$^{-1}$ | R(450) nm | R(550) nm | R(650) nm |
|---|---|---|---|---|---|---|---|---|---|
| Ex. 15 | 47 | — | 53 | — | 162 | 17 | −2 | 7 | 9 |
| Ex. 16 | 50 | — | 50 | — | 166 | 18 | −8 | 0 | 3 |
| Ex. 17 | 53 | — | 47 | — | 170 | 18 | −11 | −3 | 1 |
| Ex. 18 | — | 80 | 20 | — | 135 | 29 | −11 | −3 | −2 |
| Ex. 19 | — | 70 | 30 | — | 136 | 27 | −2 | 2 | 4 |
| C. Ex. 1 | — | — | — | 100 | 158 | 80 | 268 | 248 | 241 |
| C. Ex. 4 | 74 | — | — | 26 | 234 | 44 | −44 | 0 | 16 |

Ex.: Example
C. Ex.: Comparative Example

TABLE 4

| | BCF | BPEF mol % | SPG mol % | BPA mol % | Photoelastic constant $10^{-12}$ Pa$^{-1}$ | R(450) nm | R(550) nm | R(650) nm |
|---|---|---|---|---|---|---|---|---|
| Ex. 20 | 90 | — | 10 | — | 28 | −181 | −141 | −131 |
| Ex. 21 | 85 | — | 15 | — | 26 | −176 | −138 | −127 |
| Ex. 22 | 80 | — | 20 | — | 25 | −143 | −120 | −111 |
| Ex. 23 | — | 90 | 10 | — | 29 | −106 | −73 | −60 |
| Ex. 24 | — | 85 | 15 | — | 29 | −70 | −50 | −43 |
| C. Ex. 5 | 81 | — | — | 19 | 42 | −118 | −100 | −95 |

Ex.: Example
C. Ex.: Comparative Example

Abbreviations in the tables mean the following:
BCF: 9,9-bis(4-hydroxy-3-methylphenyl)fluorene
BPEF: 9,9-bis[4-(2-hydroxyethoxy)phenyl]fluorene
SPG: 3,9-bis(2-hydroxy-1,1-dimethylethyl)-2,4,8,10-tetraoxaspiro[5.5]undecane (spiroglycol)
BPA: 2,2-bis(4-hydroxyphenyl)propane
ISS: Isosorbide

EFFECT OF THE INVENTION

In the present invention, since the polycarbonate copolymer has excellent melt processability, an optical film having desired chromatic dispersibility is obtained by stretching. The optical film of the present invention has reverse chromatic dispersibility that its retardation becomes smaller as the wavelength becomes shorter and a low photoelastic constant. The optical film of the present invention can be used alone to control the wavelength at a broad band.

INDUSTRIAL APPLICABILITY

The optical film of the present invention is extremely useful as a retardation film or a protective film for liquid crystal displays and organic EL displays. Therefore, the optical film of the present invention is advantageously used in liquid crystal displays, optical pick-up devices, optical recording media, light emitting devices, optical arithmetic elements, optical communication elements and touch panels.

The invention claimed is:

1. An optical film which is made of a polycarbonate copolymer consisting essentially of a unit (A2) represented by the following formula:

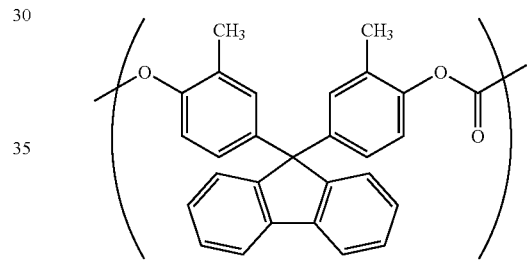

and a unit (B1) represented by the following formula:

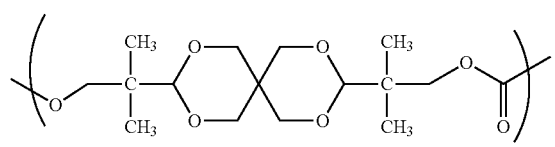

wherein an (A2/B1) molar ratio of the unit (A2) to the unit (B1) is 20/80 or more and less than 40/60 and which satisfies the following expression (1):

$$R(450) < R(550) < R(650) \tag{1}$$

wherein R(450), R(550) and R(650) are retardation values within a plane of the film at wavelengths of 450 nm, 550 nm and 650 nm, respectively, wherein a 5% weight loss temperature (Td) by heat of the polycarbonate copolymer is 380° C. or higher, and wherein an absolute value of photoelastic constant of the film is not more than $20 \times 10^{-12}$ Pa$^{-1}$.

2. The film according to claim 1 which satisfies the following expressions (2) and (3):

$$0 < R(450)/R(550) < 1 \tag{2}$$

$$1.01 < R(650)/R(550) < 2 \tag{3}$$

3. The film according to claim 1 which is a retardation film.

4. A liquid crystal display comprising the retardation film of claim 3.

5. A circularly polarizing film which comprises the film of claim 1 and a polarizing layer.

6. A display element comprising the circularly polarizing film of claim 5 as an antireflection film.

* * * * *